(12) United States Patent
Lindström et al.

(10) Patent No.: US 8,787,211 B2
(45) Date of Patent: Jul. 22, 2014

(54) METHODS AND ARRANGEMENTS FOR CONFIGURING THE L2GPS IN A FIRST STP DOMAIN CONNECTED TOWARDS A SECOND STP DOMAIN

(75) Inventors: Johan Lindström, Hägersten (SE); Lars Bertil Marklund, Stockholm (SE); Patrik Herneld, Tullinge (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 214 days.

(21) Appl. No.: 13/319,366

(22) PCT Filed: May 13, 2009

(86) PCT No.: PCT/SE2009/050534
§ 371 (c)(1),
(2), (4) Date: Nov. 8, 2011

(87) PCT Pub. No.: WO2010/132004
PCT Pub. Date: Nov. 18, 2010

(65) Prior Publication Data
US 2012/0051266 A1    Mar. 1, 2012

(51) Int. Cl.
*H04L 12/28* (2006.01)
*H04L 12/56* (2006.01)
*H04L 12/46* (2006.01)
*H04L 12/66* (2006.01)

(52) U.S. Cl.
CPC ............... *H04L 45/66* (2013.01); *H04L 45/72* (2013.01); *H04L 45/48* (2013.01); *H04L 12/462* (2013.01); *H04L 45/00* (2013.01); *H04L 12/66* (2013.01)
USPC ............ 370/256; 370/255; 370/401; 370/408

(58) Field of Classification Search
CPC ......... H04L 45/28; H04L 45/00; H04L 45/48; H04L 45/66; H04L 12/462; H04L 12/5689; H04L 12/46
USPC .................................. 370/256, 255, 401, 408
See application file for complete search history.

(56) References Cited

U.S. PATENT DOCUMENTS

| | | | |
|---|---|---|---|
| 2004/0190454 A1* | 9/2004 | Higasiyama | 370/238 |
| 2007/0076635 A1* | 4/2007 | Tallet | 370/255 |
| 2009/0144403 A1* | 6/2009 | Sajassi et al. | 709/223 |
| 2009/0161584 A1* | 6/2009 | Guan | 370/256 |
| 2010/0220730 A1* | 9/2010 | Finn et al. | 370/395.1 |
| 2010/0220737 A1* | 9/2010 | Finn et al. | 370/401 |
| 2011/0044346 A1* | 2/2011 | Mueller et al. | 370/401 |

* cited by examiner

*Primary Examiner* — Asad Nawaz
*Assistant Examiner* — Najeebuddin Ansari

(57) ABSTRACT

Embodiments of the present invention relate to methods and arrangements for configuring the L2GPs in a first STP domain connected towards a second STP domain such that L2GPs in the first STP domain are assigned with the same Pseudo Root identity. Thus the Pseudo Root identity does not have to be changed if one of the L2GPs goes down, which implies that count-to-infinity loops may be avoided. It should be noted that only one L2GP is allowed to be open towards the second STP domain. The root path costs are assigned to the L2GPs towards the pseudo root and the value of the root path cost controls which of the L2GPs that should be open. The most preferred L2GP will be given a root path cost=0, the second best L2GP will have a path cost which is high enough so the two ports never will be open at the same time if there is connectivity between the Ethernet switches having the L2GPs.

6 Claims, 8 Drawing Sheets

METHODS AND ARRANGEMENTS FOR CONFIGURING THE L2GPS IN A FIRST STP DOMAIN CONNECTED TOWARDS A SECOND STP DOMAIN

TECHNICAL FIELD

The present invention relates to methods and arrangements in a switched Ethernet, and in particular to a solution for avoiding transmission loops.

BACKGROUND

In a switched Ethernet, it is desired to avoid transmission loops since the network would collapse if frames are sent in loops and self learning addressing deteriorates. Examples of loops in a switched Ethernet are illustrated in FIG. 1.

In addition, loops must also be avoided to achieve redundancy in the network. There are two major techniques for providing redundancy while avoiding transmission loops referred to as link aggregation and solutions based on Spanning Tree Protocol (STP).

Link aggregation (defined in IEEE 802.3 2005) is a method to achieve higher bandwidth and/or redundancy in Ethernet networks. Two or more physical links are combined and treated as one physical link. Hence, a number of the physical links will be treated as one Link Aggregation Group as illustrated in FIG. 2.

There are different Spanning Tree Protocol modes, defined in STP IEEE 802.1d, e.g. Rapid Spanning Tree Protocol IEEE 802.1d and Multiple Spanning Tree Protocol IEEE 802.1q. The principle of the STP is that one of the Ethernet Switches is elected as a root switch in the network, and in the spanning tree every switch has exactly one way to reach the root switch. All other Ethernet switches calculate their path cost to reach the root switch. The cheapest path cost is opened, and all other links are blocked for traffic as illustrated in FIG. 3.

In all STP modes the path cost is used to calculate the cheapest way to reach the root. The path cost is either fixed or based on the bandwidth available on the physical link. When a physical link between two switches is replaced by a LAG (Link Aggregation Group), the bandwidth and cost may vary dependent on the number of operating physical links. The path cost is calculated automatically according to the following formula:

Path cost=20 000 000 000 000/Bandwidth

This implies that a bandwidth of 1 Gbit/second gives the path cost 20000.

An additional technique used for STP is to use Layer 2 Gateway Port (L2GP) defined in IEEE 802.1ah 2008. This technique is used to separate different STP domains. One or more ports are elected as Layer two Gateway Ports (L2GPs), which will define the border of a domain in which the STP algorithm is active. Only one L2GP will be open towards another STP domain, i.e. the one with the best root identity, i.e. priority and MAC address. A pseudo root switch is emulated outside the own STP domain.

This is illustrated in FIG. 4 where the L2GP port in the left switch 400 in RSTP domain 1 has lower (better) priority than the L2GP in the right switch 401 which implies that the left switch 400 is open towards the other domain.

When the switch or the physical link where L2GP is configured goes down, any remaining physical loops may open all ports and create loops that results in that frames a caught in the loop. When a root is included in the domain, the solution is to always include the root switch in any loop.

However, when using L2GP, the root switch is not included in the RSTP domain and when the external link to Ethernet Switch 1 goes down, the switches in RSTP domain 1 will experience that the root switch disappears. It takes a certain time period to update the network with a new root switch. During this time period, the problem referred to as "count-to-infinity" may create temporary loops in the RSTP domain 1, as some Ethernet switches has "old" information which not reflects the change of the root switch. Based on this "old" information, the Ethernet switch may decide to open paths such that temporary loops are created.

FIG. 5 illustrates two STP domains 502, 503 where the L2GP of Ethernet Switch 1 500 has gone down and the assigned pseudo root identity no longer is valid as root identity.

The pseudo root must therefore be changed to the pseudo root of Ethernet Switch 2. Since it take some time for the network to be updated with the new pseudo root, the RSTP domain 1 502 may create loops as a result of count-to-infinity problem as long as the network is not fully updated with the new pseudo root.

SUMMARY

The object of the present invention is to provide a solution for avoiding count-to-infinity loops.

This is solved by adding a root path cost from the L2GP to the pseudo root. In addition, all L2GPs shall use the same (identical) pseudoroot identity but which L2GP that is open towards the pseudo root is dependent on the root path cost which is set on the L2GP. The most preferred port may have cost 0, the second best may have a path cost which is high enough resulting in that the two ports never will be open at the same time if they are connected.

According to a first aspect of the present invention a method in an STP domain comprising a plurality of Ethernet switches interconnected by links, wherein at least two of the plurality of Ethernet switches comprise ports defined as L2GPs is provided. In the method, at least two L2GPs are configured to the same pseudo root outside the STP domain by means of a first emulated connection and a second emulated connection. The L2GP is associated with a root path cost from the respective L2GP to the pseudo root, wherein the root path cost of the first L2GP differs from the root path cost of the second L2GP to only keep one of the first emulated connection and the second emulated connection open towards the pseudo root. That may be achieved by assigning the same pseudo root identity to the L2GPs.

According to second aspect of the present invention an STP domain comprising a plurality of Ethernet switches interconnected by physical links is provided. At least two of the plurality of Ethernet switches comprise ports defined as L2GPs. The at least two Ethernet switches comprising a first L2GP and a second L2GP, respectively, are configured to have emulated connections to the same pseudo root outside the STP domain by means of a first emulated connection and a second emulated connection, respectively. Further each of the L2GPs is configured with a root path cost from the respective Ethernet switch to the pseudo root, wherein the root path cost of the first L2GPs differs from the root path cost of the second L2GP to only keep one of the first emulated connection and the second emulated connection open towards the pseudo root (709). That may be achieved by assigning the L2GP switch the same pseudo root identity to achieve the emulated connections from the L2GPs to the same pseudoroot.

According to a third aspect of the present invention an Ethernet switch for an STP domain comprising a plurality of Ethernet switches interconnected by physical links is provided. The Ethernet switch and at least one further Ethernet switch of the plurality of Ethernet switches of the STP domain comprise ports defined as L2GPs. Said Ethernet switch is configured to be connected to the same pseudo root outside the STP domain as the further Ethernet switch by means of a first emulated connection. The further Ethernet switch is configured to be connected to said pseudo root outside the STP domain by means of a second emulated connection. In addition, the Ethernet switch is further configured to associate a root path cost to its L2GP and to keep track of root path costs of the L2GPs of other Ethernet switches of the STP domain (703), such that the root path cost of the first L2GP differs from the root path cost of the L2GPs of the other Ethernet switches to only keep one of the first emulated connection and the second emulated connection open towards the pseudo root (709), e.g. the L2GP with the lowest root path cost.

An advantage with embodiments of the present invention is as the same Pseudo Root identity will be used for all switches, there is no risk for the count-to-infinity problem and the convergence time is also decreased when a L2GP goes down or when the external link disappears, since there is no need to select a new root.

A yet further advantage with an embodiment of the present invention is that if the L2GP Root Path Cost is expressed as a function of the bandwidth it is possible to consider bandwidth at selection of which L2GP that shall be open.

DETAILED DESCRIPTION

Figure 1:
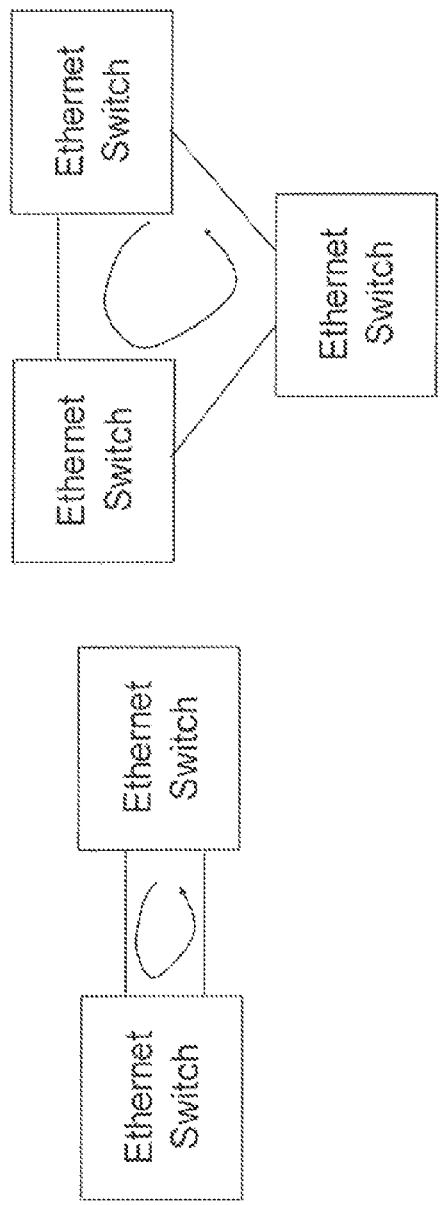
FIGS. 1-5 illustrate Ethernet Switches in different configurations according to prior art.
Figure 2:
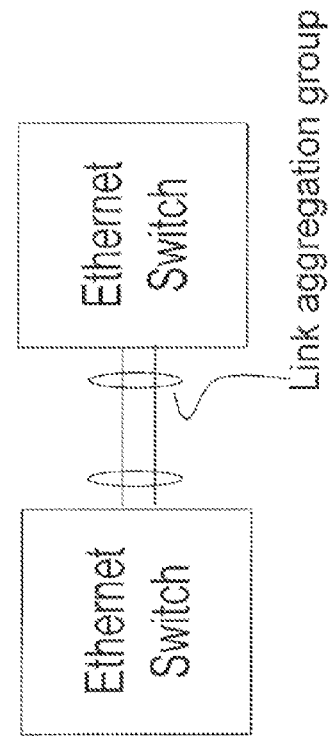
Figure 3:
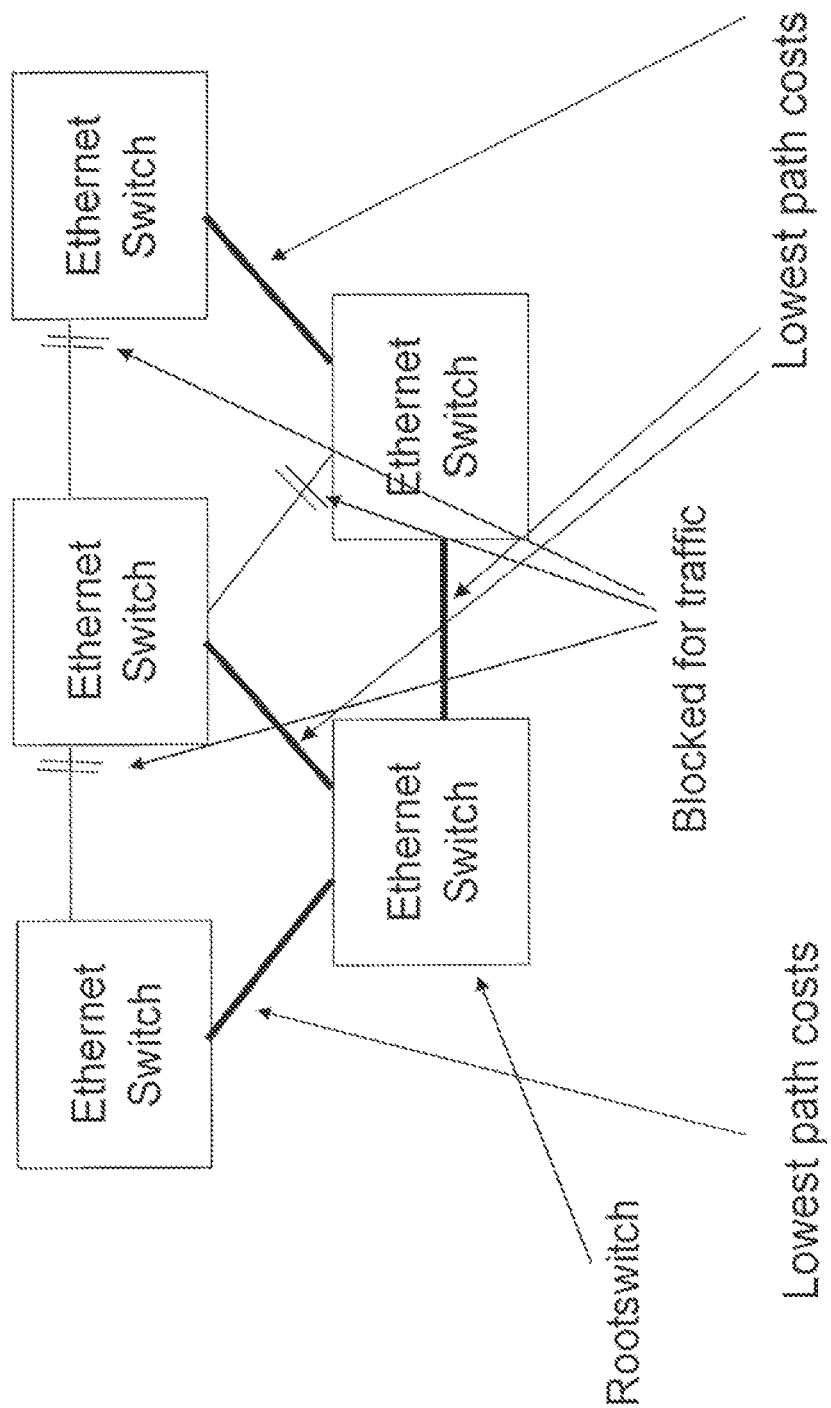
Figure 4:
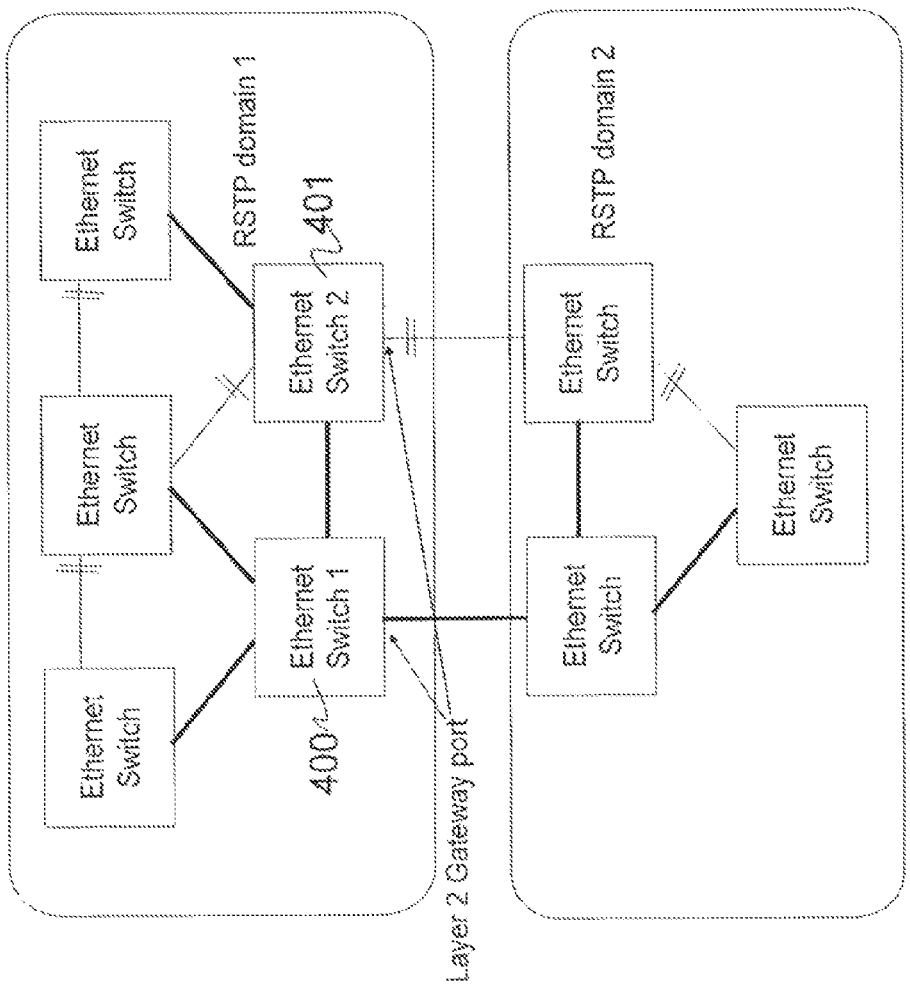
Figure 5:
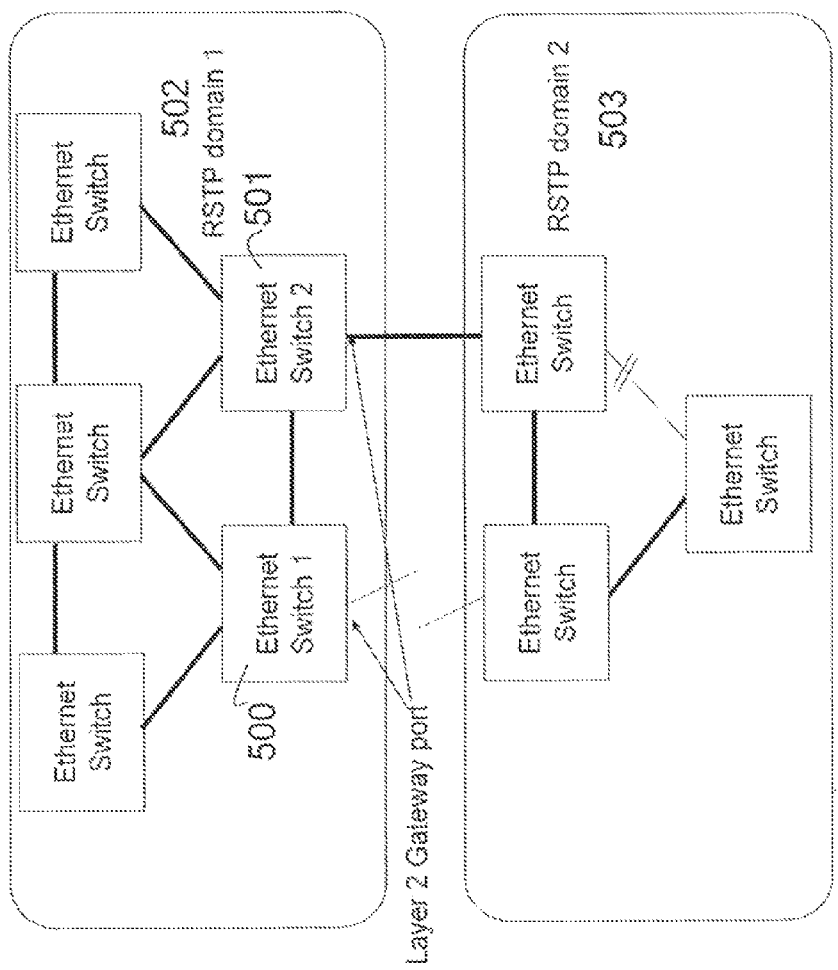

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The embodiments of the present invention are applicable to networks of Ethernet switches configured for STP such as RSTP (Rapid STP) and MSTP (Multiple STP). Accordingly, at least two Ethernet switches in an STP domain have ports that are configured as Layer two Gateway Ports (L2GP). However, only one of the elected L2GPs will be open towards another STP domain.

In the solutions of prior art, a failure in an Ethernet Switch, defined as a L2GP, results in that the Pseudo Root identity assigned to that switch is no longer valid which implies that the Pseudo Root identity need to be changed. During the time it takes to determine a new Pseudo Root Identity to be assigned to another L2GP, count-to-infinity loops may be created.

The basic idea of the present invention is to configure the L2GPs in a first STP domain connected towards a second STP domain such that L2GPs in the first STP domain are assigned with the same Pseudo Root identity. Thus the Pseudo Root identity does not have to be changed if one of the L2GPs goes down, which implies that count-to-infinity loops may be avoided. It should be noted that only one L2GP is allowed to be open towards the second STP domain. The root path costs are assigned to the L2GPs towards the pseudo root and the value of the root path cost controls which of the L2GPs that should be open. The most preferred L2GP will be given a root path cost=0, the second best L2GP will have a path cost which is high enough so the two ports never will be open at the same time if there is connectivity between the Ethernet switches having the L2GPs.

If a L2GP port in the first STP domain goes down, the switch connected to this port will inform the surrounding switches that the root path cost to the assigned pseudo root has increased significantly. This means that the Ethernet switches of the first STP domain will get a lower path cost towards another L2GP port in the first STP domain. Hence a failure to a L2GP is considered as a link failure and since the Pseudo Root identity is unchanged there is no risk of count-to-infinity loops.

Figure 6:
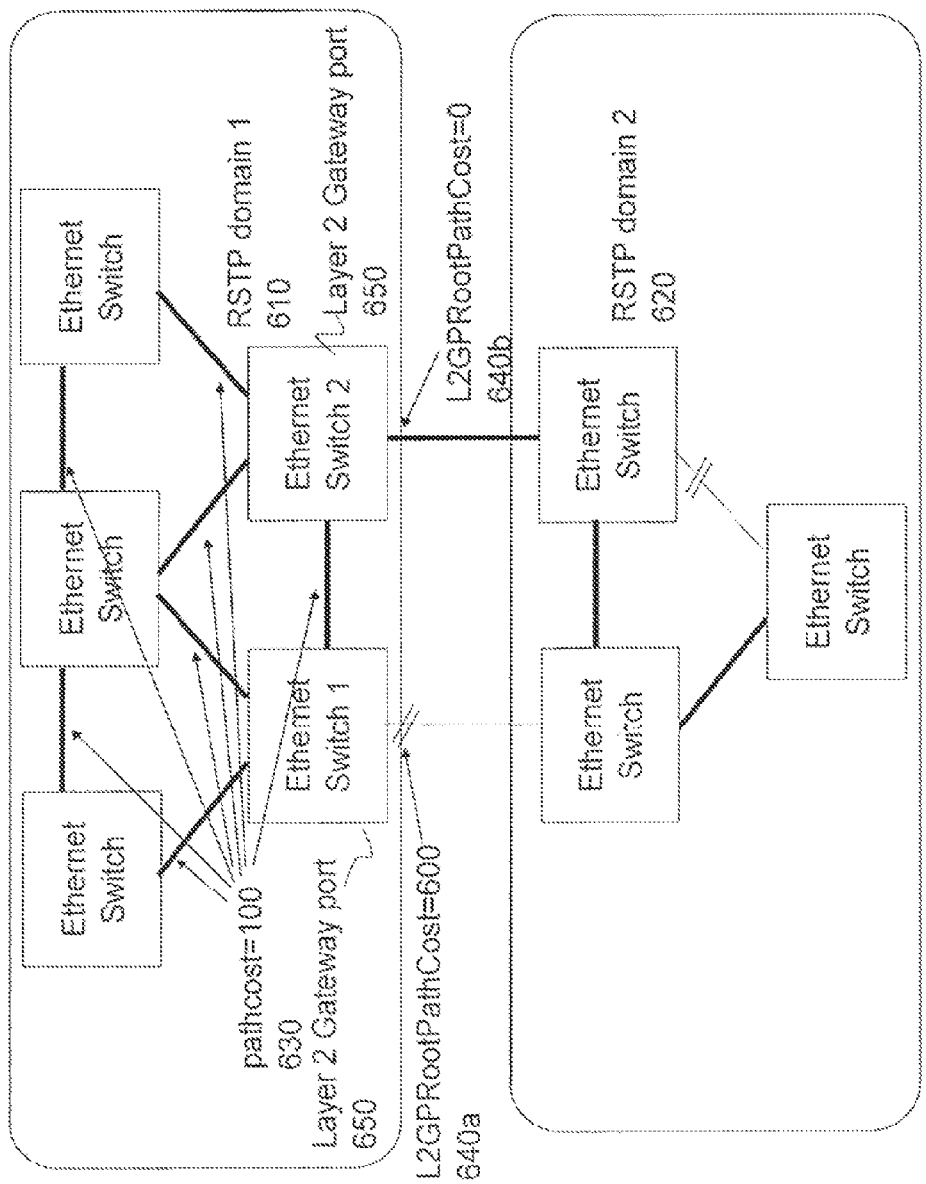
FIGS. 6-8 illustrate different embodiments of the present invention.

Turning now to FIG. 6 illustrating two RSTP domains RSTP1 and RSTP2 610, 620. In RSTP domain 1 a path cost 630 of "100" is assigned to each physical link in this example. The ports of the Ethernet switches 1 and 2 are defined as L2GPs 650. The L2GPs are assigned with root path costs 640*a* and 640*b* to an emulated pseudo root in RSTP 2. The root path cost from Ethernet switch 2 is lower than the root path cost from Ethernet switch 1, which indicates that the physical connection from Ethernet switch 2 should be open towards the RSTP domain 2. Thus a new variable such as "L2GPRootPathCost" may be introduced for L2GPs. A pseudo root is emulated outside the RSTP domain 1 to which both of the L2GPs of RSTP domain 1 have an emulated connection. The state of the physical link between RSTP domain 1 and RSTP domain 2 determines the state of the emulated link.

Figure 7:
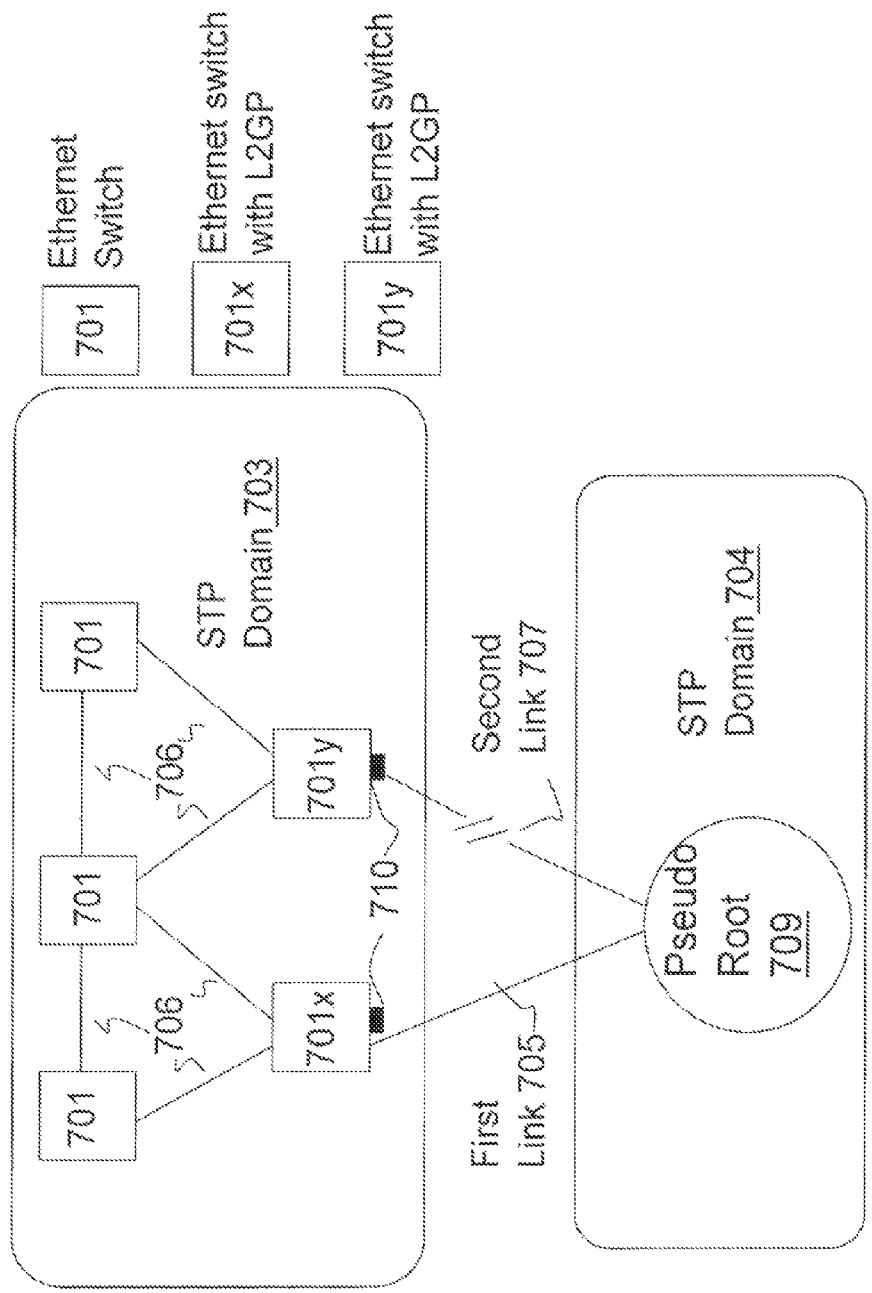

The embodiments of the present invention are further explained in conjunction with FIG. 7. An STP domain 703 is schematically illustrated comprising a plurality of Ethernet switches 701, 701*x*, 701*y* interconnected by physical links 706. At least two 701*x*,701*y* of the plurality of Ethernet switches comprise ports defined as L2GPs. The at least two Ethernet switches 701*x*,701*y* comprising L2GPs are configured to have emulated connections to the same pseudo root 709 outside the STP domain 703 (in STP domain denoted 704) by means of a first emulated connection 705 and a second emulated connection 707, respectively. Further, each of these L2GPs is configured with a root path cost 640 from the respective Ethernet switch to the pseudo root 709 to control which of the L2GPs that should be used. The control is achieved by assigning the path cost of the first and second L2GP such that the path cost of the first L2GP differs from the path cost of the second L2GP. The L2GP with the lowest path cost will be open towards the pseudo root (709).

If there shall be connectivity between all Ethernet switches in one STP domain, without relying on external networks, the root path cost has to be different for all L2GPs as stated above. The difference between the root path cost must be large enough so the STP mechanisms can guarantee that there is only one open path from the L2GP of one STP domain to another.

E.g., the root path cost (L2GPRootPathCost) can be set to zero for the L2GP which is configured as the "most preferred L2GP". For the second best L2GP, the root path cost (L2GPRootPathCost) should exceed the maximum path cost between the best and the second best L2GP. If a L2GP receives an indication that another L2GP has lower root path cost than its own root path cost, then the L2GP should be closed. The root path cost is set for each L2GP during network configuration.

Figure 8:
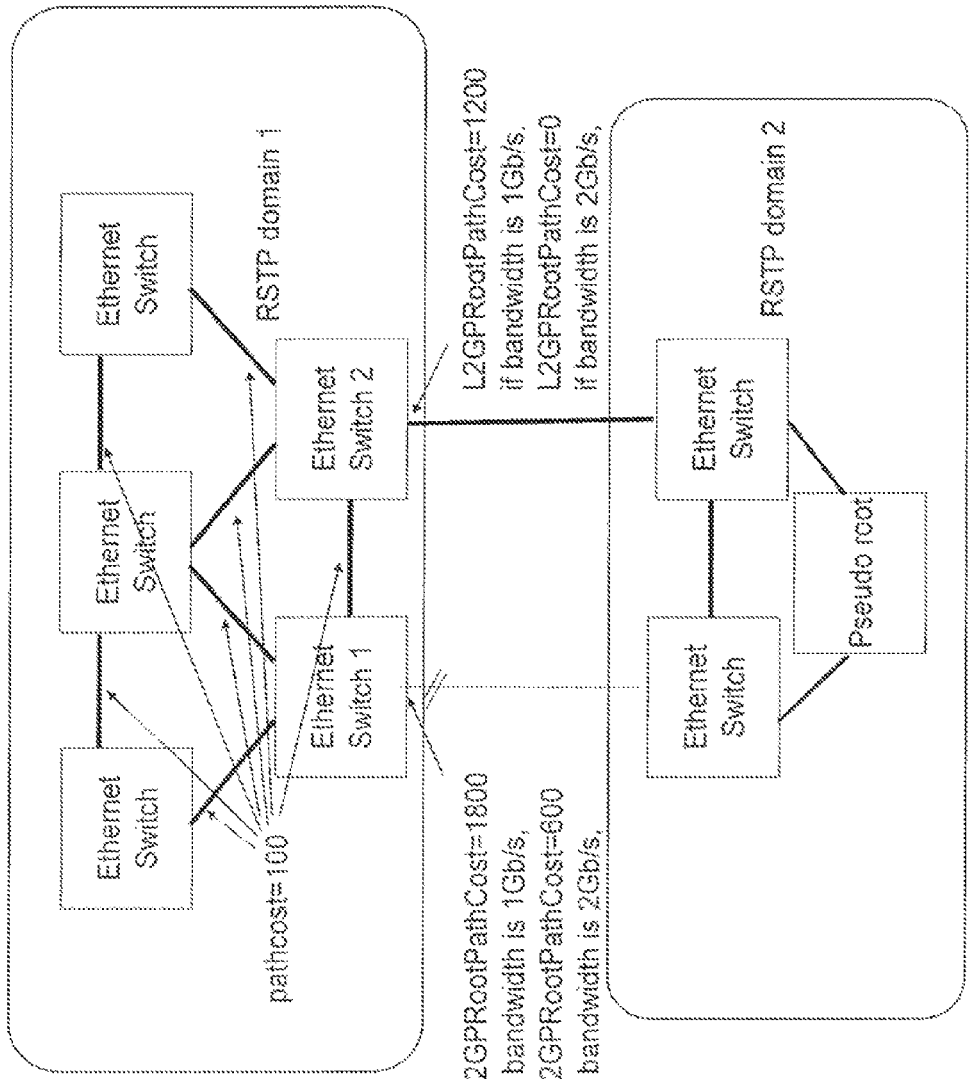
Figure 9:
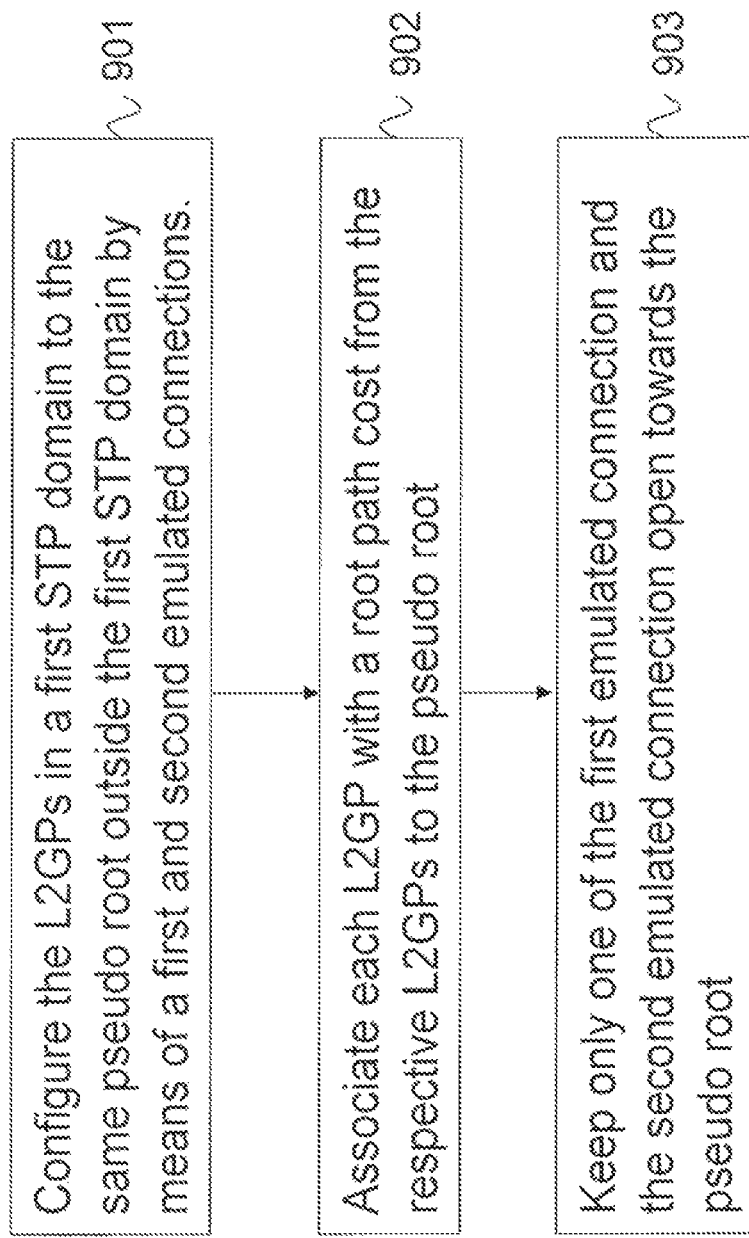
FIG. 9 is a flowchart of the method according to one embodiment of the present invention.

According to one embodiment, the root path cost of the L2GP is a function of the bandwidth of its associated physical link. This is illustrated in FIG. 8, where the root path cost depends on the size of the available bandwidth. Moreover, the physical links, e.g. the physical links 705, 707 between the STP domains may be a group of physical links referred to as a link aggregation group. The link aggregation group is a plurality of physical links considered as one resource. Accordingly, the root path cost of the L2GP may also be a function of the bandwidth of a link aggregation group associated with the L2GP. It is also possible to let the root path cost of the L2GP associated with the link aggregation group be dependent on the number of working physical links.

According to one embodiment, the Ethernet switches 701x, 701y are configured to be assigned with the same pseudo root identity to achieve the emulated connections from the L2GPs to the same pseudo root.

Furthermore, the present invention is also related to a method in an STP domain comprising a plurality of Ethernet switches interconnected by physical links, wherein at least two of the plurality of Ethernet switches comprise ports defined as a first L2GP and a second L2GP. The method comprises the steps of:

901. Configure the at least the first L2GP and the second L2GP to the same pseudo root outside the STP domain by means of a first emulated connection and a second emulated connection, respectively.

902. Associate each L2GP with a root path cost from the respective Ethernet switch to the pseudo root, wherein the root path cost of the first L2GP differs from the root path cost of the second L2GP.

903. Keep only one of the first emulated connection and the second emulated connection open towards the pseudo root. This is possible thanks to the assignment of the differing root path costs.

Accordingly, an Ethernet 701x switch according to embodiments of the present invention means is configured to be connected to the same pseudo root 709 outside the STP domain as a further Ethernet switch 701y by means of a first emulated connection 705 and the further Ethernet switch 701y is configured to be connected to said pseudo root 709 outside the STP domain 703 by means of a second emulated connection 707. The Ethernet switch 701x is further configured to associate a root path cost 640 to its L2GP and to keep track of root path costs of other L2GPs of the STP domain 703, such that the root path cost of the first L2GP differs from the root path cost of the second L2GP to only keep one of the first emulated connection and the second emulated connection open towards the pseudo root 709. As stated above, the Ethernet switch is configured to keep track of root path costs of other L2GPs of the STP domain. When an Ethernet switch gets information that another L2GP has a lower root path cost, it closes its emulated connection to the pseudo root.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in a Spanning Tree Protocol (STP) domain comprising a plurality of Ethernet switches interconnected by links, wherein at least two of the plurality of Ethernet switches comprise ports defined as Layer 2 Gateway Ports (L2GPs), comprising the steps of:
   configuring the at least two L2GPs to the same pseudo root outside the STP domain by means of a first emulated connection and a second emulated connection, wherein the emulated connections from the L2GPs to the same pseudo root is achieved by assigning the same pseudo root identity to the L2GPs, and
   associating L2GP with a root path cost from the respective L2GP to the pseudo root, wherein the root path cost of the first L2GP differs from the root path cost of the second L2GP to only keep one of the first emulated connection and the second emulated connection open towards the pseudo root, wherein the root path cost of the L2GP is a function of the bandwidth of an associated physical link or physical link aggregation group.

2. The method according to claim 1, wherein a physical link aggregation group from an Ethernet switch comprises at least two physical links and the root path cost of the L2GP associated with the link aggregation group is dependent on the number of working physical links.

3. A Spanning Tree Protocol (STP) domain comprising a plurality of Ethernet switches interconnected by physical links, wherein at least two of the plurality of Ethernet switches comprise ports defined as Layer 2 Gateway Ports (L2GPs), wherein the at least two Ethernet switches comprising a first L2GP and a second L2GP, respectively, are configured to have emulated connections to the same pseudo root outside the STP domain by means of a first emulated connection and a second emulated connection, respectively, and each of L2GPs is configured with a root path cost from the respective Ethernet switch to the pseudo root, wherein the root path cost of the first L2GPs differs from the root path cost of the second L2GP to only keep one of the first emulated connection and the second emulated connection open towards the pseudo root, wherein the L2GPs of the Ethernet switches are configured to be assigned with the same pseudo root identity to achieve the emulated connections from the L2GPs to the same pseudo root, wherein the root path cost of the L2GP is a function of the bandwidth of an associated physical link or physical link aggregation group.

4. The STP domain according to claim 3, wherein a physical link aggregation group from an Ethernet switch comprises at least two physical links and the root path cost of the L2GP associated with the link aggregation group is dependent on the number of working physical links.

5. An Ethernet switch for a Spanning Tree Protocol (STP) domain, wherein the STP domain includes a plurality of Ethernet switches interconnected by physical links, wherein the Ethernet switch and at least one further Ethernet switch of the plurality of Ethernet switches of the STP domain comprise ports defined as Layer 2 Gateway Ports (L2GPs) wherein said Ethernet switch is configured to be connected to the same pseudo root outside the STP domain as the further Ethernet switch by means of a first emulated connection and the further Ethernet switch is configured to be connected to said pseudo root outside the STP domain by means of a second emulated connection, the Ethernet switch is further configured to associate a root path cost to its L2GP and to keep track of root path costs of the L2GPs of other Ethernet switches of the STP domain, such that the root path cost of the first L2GP differs from the root path cost of the L2GPs of the other Ethernet switches to only keep one of the first emulated connection and the second emulated connection open towards the pseudo root, wherein the L2GP of the Ethernet switch is configured to be assigned with the same pseudo root identity as the L2GP of the further Ethernet switch to achieve the emulated connections from the Ethernet switches to the same pseudo root, wherein the root path cost of the L2GP is a function of the bandwidth of an associated physical link or physical link aggregation group.

6. The Ethernet switch according to claim 5, wherein a physical link aggregation group from an Ethernet switch comprises at least two physical links and the root path cost of the L2GP associated with the link aggregation group is dependent on the number of working physical links.

* * * * *

UNITED STATES PATENT AND TRADEMARK OFFICE
CERTIFICATE OF CORRECTION

PATENT NO. : 8,787,211 B2
APPLICATION NO. : 13/319366
DATED : July 22, 2014
INVENTOR(S) : Lindstrom et al.

It is certified that error appears in the above-identified patent and that said Letters Patent is hereby corrected as shown below:

In the Specification

In Column 2, Line 18, delete "it take" and insert -- it takes --, therefor.

Signed and Sealed this
Nineteenth Day of May, 2015

Michelle K. Lee
*Director of the United States Patent and Trademark Office*